United States Patent Office 2,918,688
Patented Dec. 29, 1959

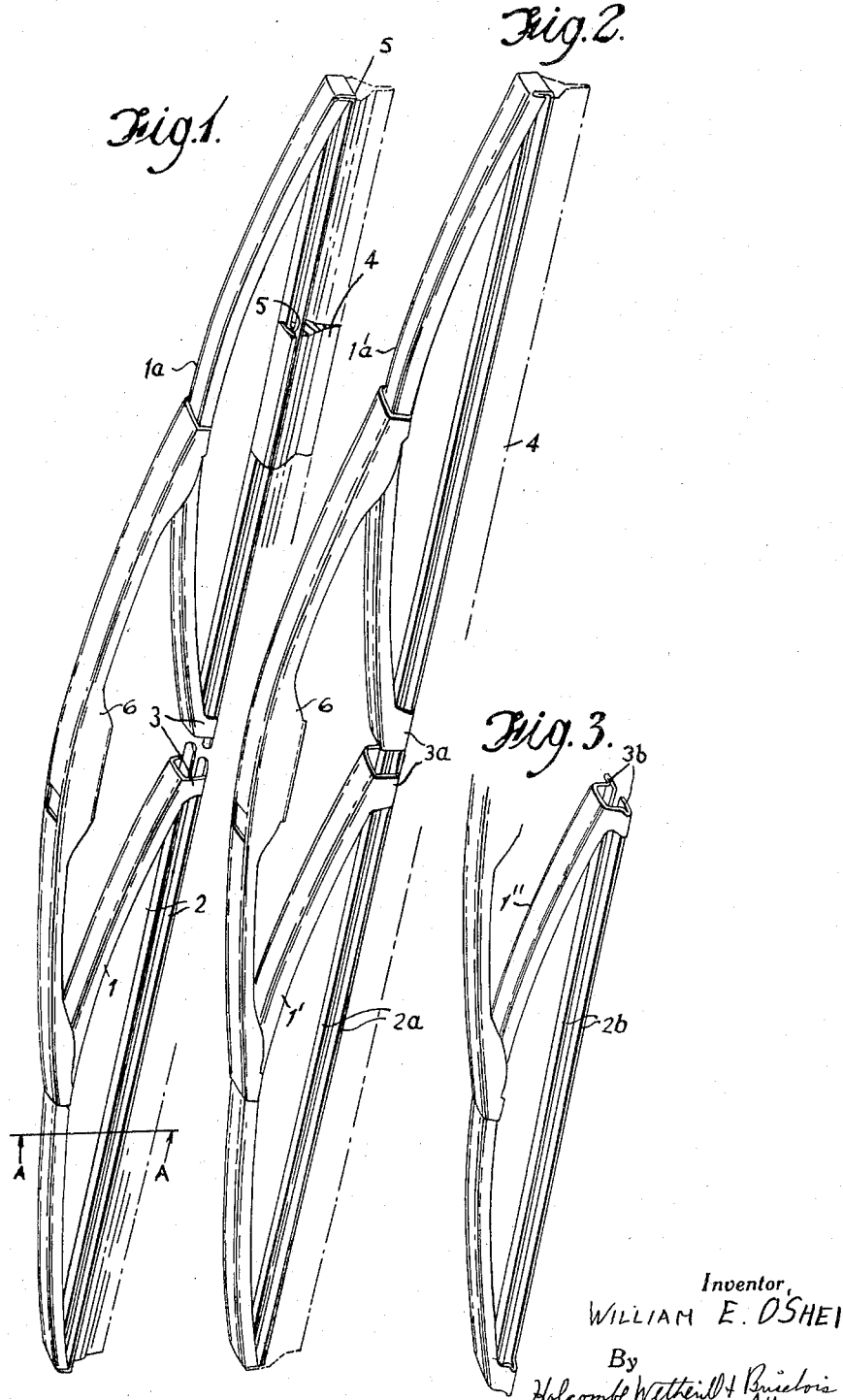

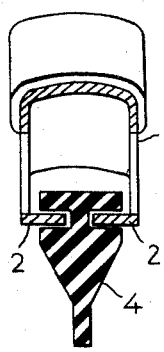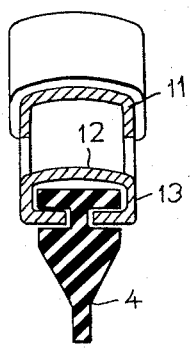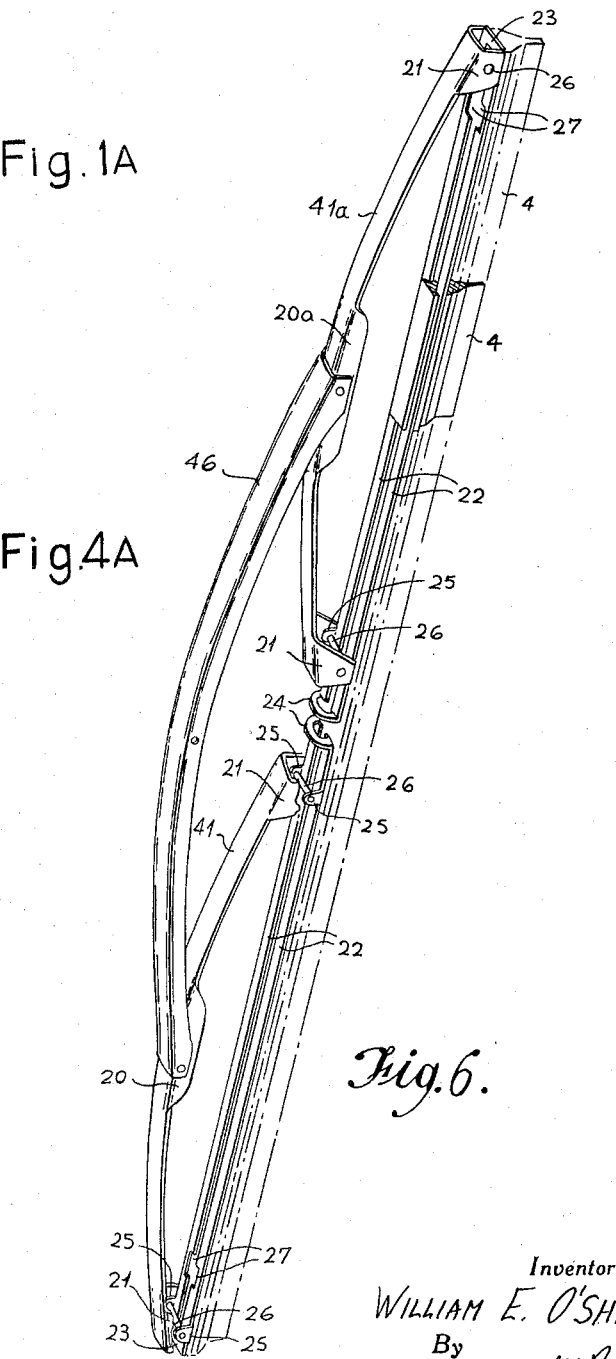

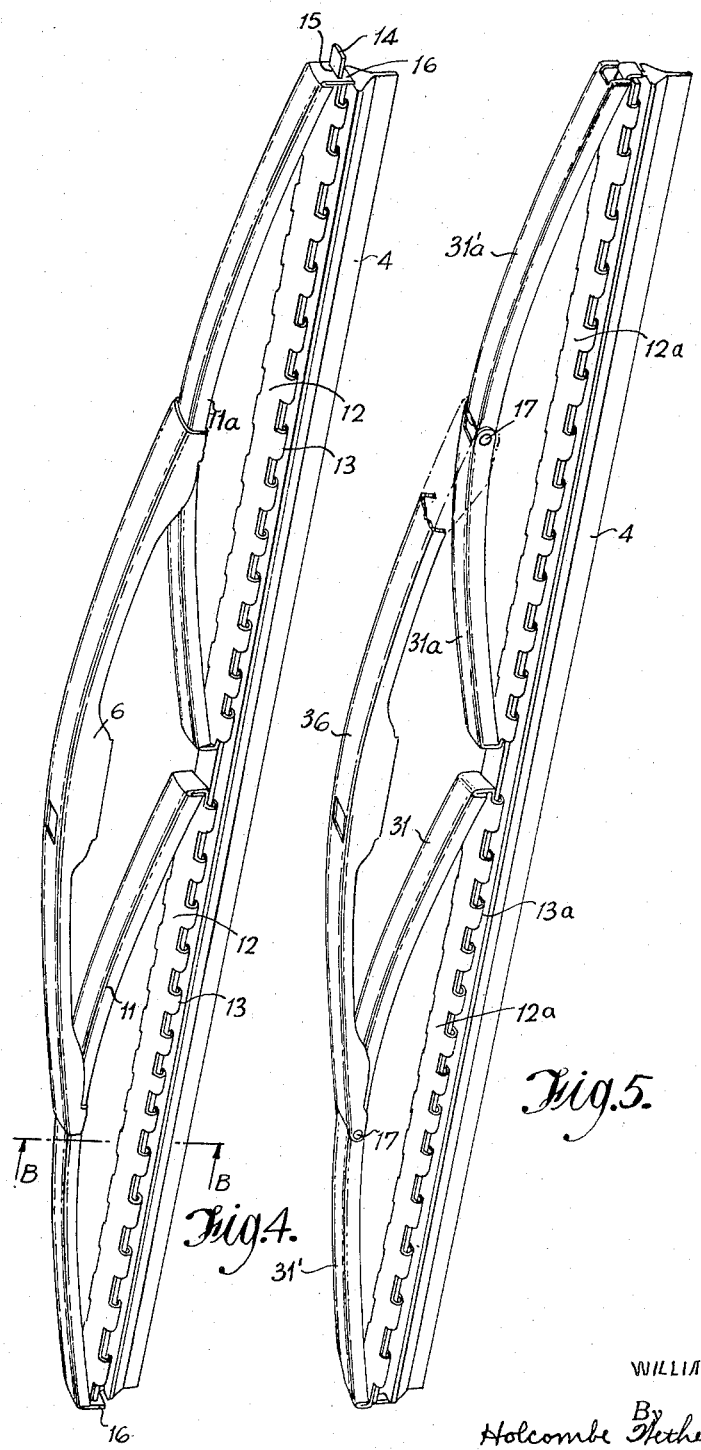

2,918,688

WINDSCREEN WIPER BLADES

William Edward O'Shei, London, England

Application January 20, 1955, Serial No. 483,134

13 Claims. (Cl. 15—245)

The present invention relates to windscreen wiper blades which are capable of wiping curved windscreens. Such blades usually comprise one or more flexible strips which are assembled along and at or adjacent the rear of the squeegee element so as to permit the latter to flex in the plane of the squeegee but to restrain transverse flexing thereof, the wiper arm pressure being distributed at spaced points along the squeegee element by means of yoke members which are, in turn interconnected by a bridge-piece, the bridge-piece being provided with means for attaching it to a wiper arm. Known blades of this type are described in United States Patent 2,596,063 dated May 6, 1952 of J. W. Anderson In such known blades the flexible strip (or strips) extends for the full length of the squeegee element and when the wiper blade flexes to conform with a convex windscreen, the strip flexes both along those parts which span the distance between the ends of the yokes as well as along those parts which lie between the ends of adjacent yokes. The flexure of the parts of the strip between the ends of adjacent yokes produces a force tending to restore the yokes to the relative positions which they assume when wiping a flat screen, and consequently this restoring force tends to lift the outer extremities of the blade away from the surface of the screen when the blade is wiping a convex surface.

An object of the present invention is to provide an improved construction of wiper blade in which this tendency for the flexible strip or strips, when flexed, to lift the outer extremities of the blade away from the windscreen, is reduced.

A further object of the invention is to provide a windscreen wiper blade which is constructed of a minimum number of separate parts. Another object is to provide a wiper blade in which the flexible strip or strips are made integral with the yoke or yokes.

Further objects of the invention will be apparent from the following description taken in conjunction with the accompanying drawings which show, by way of example, various constructions of wiper blade according to this invention. In the drawings:

Fig. 1 is a perspective view of one embodiment of the invention in which the flexible strips extend only over the length of a yoke, Fig. 1A is a section along line A—A in Fig. 1, Fig. 2 is a perspective view of a modification in which the flexible strips extend for the full length of the blade, Fig. 3 is a perspective view of part of a wiper blade assembly, showing a further modified construction, Figs. 4, 5 and 6 are perspective views of further embodiments.

Fig. 4A is a section along the line B—B in Fig. 4.

In the embodiment shown in Fig. 1, the wiper blade comprises two yokes 1, 1a which are arranged end-to-end along the back of the squeegee element 4, intermediate points on the yokes 1, 1a being hingedly connected to opposite ends of the bridge-piece 6 which is provided with means for attaching it to a wiper arm. The flexible strips which are assembled along the squeegee element and permit flexing thereof in its plane whilst restraining transverse flexing thereof, are constituted by the pairs of spaced parallel strips 2 which respectively span the ends of a yoke, each pair being separated from the adjacent pair in the space between the inner ends of the two yokes. The strips are assembled to the squeegee element 4 by interfitting with grooves 5 along opposite sides of the squeegee element.

In the embodiment shown in Fig. 1, the yokes 1, 1a are formed from sheet metal with the flexible strips 2 integral therewith. In manufacture these strips are first formed to project longitudinally from one end of a yoke and are then folded back to extend across the arch of the yoke, their free ends being embraced by channel-shaped fingers 3 or other members depending from the inner end of the yoke and serving to hold the free ends of the strips 2 from splaying apart. Preferably the fingers 3 allow the flexible strips to slide therein.

By means of the construction described, the flexible strips allow the squeegee element, when the blade is wiping over a convex portion of a windscreen, to flex between the ends of the associated yoke. The yokes also hinge about their connections to the bridge-piece and since the two pairs of strips 2 are separated from one another between adjacent yokes, the hinging movement of the yokes does not produce any flexing of the strips which would tend to urge the yokes to the position which they assume when wiping a flat screen. The blade can therefore conform to the convex curvature of the windscreen with a low wiper arm pressure.

In a modification as shown in Fig. 2, the flexible strips 2a, after being folded back beneath the yoke 1', may extend beyond the end of the yoke opposite to that where they are fixed, for example for approximately the full length of the squeegee element 4, a second yoke 1'a being connected to the projecting portions of the flexible strips 2a and the yokes being interconnected by a bridge-piece 6 with, if necessary, the interposition of secondary yokes. If desired the said second yoke 1'a may also be formed integral with the flexible strips 2a; for example, as shown in Fig. 2, the two yokes 1', 1'a can be connected to opposite ends of the strip portions 2a and be folded back over the strip portions in opposite directions so that their free ends lie adjacent the centre of the blade and support the central portions of the strips. The said free ends of the yokes may be attached to the strips by channel-shaped fingers 3a as above described or in any other convenient manner, the yokes being interconnected by the bridge-piece 6.

In a still further modification shown in Fig. 3, the metal strip portions 2b may be arranged in the blank, from which they are formed integrally with the yoke 1", so as to extend along opposite sides of the portion of the blank for forming the yoke, the strips then being folded over inwardly and towards one another to be spaced apart to receive the squeegee element therebetween. The flexible strips may be connected, as shown in Fig. 3, to one end of the yoke and be arranged to slide in channel-shaped fingers 3b formed at the other end of the yoke.

With the construction in which the flexible strips are arranged, in the blank, along opposite sides of the yoke, it will be appreciated that the strips may be formed integral with two or more yokes which may be joined with the strips at either one or both of their ends as above described.

Whilst particular embodiments have been described it will be understood that various modifications may be made without departing from the scope of the invention. For example the various constructions above described may be modified, as shown in Fig. 4, to apply to constructions in which only a single flexible strip 12 spans the distance between the ends of a yoke, two such strips 12 extending along the back of the squeegee element 4 and being connected thereto by fingers 13 or the like which embrace the rear of the squeegee element. In the embodiment shown in Fig. 4, the flexible strips 12 are integral with the inner ends of the yokes 11, 11a, the outer ends 14 of the strips 12 sliding through slots 15 in the downturned ends 16 of the yokes.

According to a feature of the present invention, each yoke of bowed or arched form is made flexible in the plane of the squeegee, either by making it so that it will be flexible at least along a part thereof, or by making it of two or more hingedly connected parts, the ends of the yoke being connected to the flexible strip or strips so that as the latter flex(es) to conform with a portion of the windscreen of increased curvature, the ends of the yoke will be moved closer together, the pressure exerted by the windscreen wiper arm on the yoke tending to force its ends apart and thus to urge the squeegee element and the flexible strip or strips to a straight condition.

In this way it no longer becomes necessary to provide a lost-motion connection at the joints between the ends of a yoke and the flexible strip or strips to which it is connected, the flexing of the strip or strips to the curved shape being permitted by the inward movement of the ends of the yoke.

In the embodiment shown in Fig. 5, the wiper blade assembly may comprise a pair of yokes 31, 31a having their ends connected at spaced points along flexible strips 12a assembled to the rear of the squeegee element 4 by the fingers 13a which engage in grooves along opposite sides of the squeegee element 4, intermediate points on the yokes being connected by a bridge-piece 36 which is provided with means for attaching it to a wiper arm. Each yoke is made in two parts 31, 31', 31a, 31'a which are hingedly connected together for rocking movement about axes 17 extending transversely to the plane of the squeegee. These hinges may be provided at the intermediate points of the yokes at which the end of the bridge-piece 36 is connected and the pin or rivet or the like which forms the hinge pin 17 for the two parts of a yoke may also serve as a hinge for connecting the end of the bridge-piece thereto.

The flexible strips 12a may be joined together at their inner ends to form a single flexible strip extending along the full length of the blade, but preferably, as shown in Fig. 5, they do not extend in one continuous length from end-to-end of the equeegee element, but are divided between the two yokes 31, 31a so that each yoke 31, 31a is connected respectively to its own flexible strip 12a which spans the arch between the ends of the associated yoke. The ends of each yoke are connected to the associated flexible strip in a manner which prevents relative longitudinal movement therebetween and to this end the yokes and strips are preferably formed integrally, the yoke parts being folded inwardly from the ends of the strips.

In operation, when a flexible strip flexes to conform with a curved portion of a windscreen, the ends of the associated yoke will be moved together thereby arching the yoke to a greater extent. The pressure exerted on the back of the yoke by the wiper arm tends to urge the ends of the yoke apart and thus restore the flexible strip to a normal straight condition. This force exerted by a yoke to straighten the associated flexible strip enables the latter to be made of more flexible material since reliance does not have to be placed on the inherent resilience of the strip for restoring the squeegee element to its straight form. The yokes also hinge relative to one another and the bridge-piece, about the hinge pins 17, this movement being freely permitted by reason of the fact that the flexible strips do not extend continuously from one end to the other of the squeegee element but are separated between adjacent yokes.

In the modification shown in Fig. 6, instead of constructing each yoke of two or more rigid parts hingedly connected together, each yoke maye be constructed so as to be flexible, at least part-way along its length, in the plane of the squeegee so that its ends can move inwardly, and thus bow the yoke to a greater extent when the associated flexible strip or strips flex(es) to conform with a curved part of the windscreen, the wiper arm pressure tending to urge the ends of the yoke outwardly to retain the flexible strip or strips in the straight condition.

As shown in Fig. 6, the yokes 41, 41a are formed of sheet metal having a channel portion 20 at the centre to which the bridge-piece 46 is hingedly connected, and ears 21 at their ends, the sections of the yokes between the parts 20 and 21 being flexible in the plane of the squeegee. The flexible strips 22 are stamped in one piece from strip metal with a central gap to interfit with the grooves along opposite sides of the squeegee element 4, the outer ends of the strips being connected by a transverse portion 23, and the inner ends being held in spaced relationship by a loop-shaped portion 24 which is shaped to fit around the back of the squeegee element 4. The strips 22 are each provided with four ears 25 through apertures in which, and in the ears 21, extend rivets 26 which assemble the strips to the yokes. Recesses 27 may be provided in the strips 22 to facilitate insertion of the squeegee element between the strips.

I claim:

1. A windscreen wiper blade comprising a squeegee element, a plurality of flexible strips arranged end-to-end and assembled to the squeegee element at or adjacent the rear thereof, a plurality of yoke members each having its opposite ends connected respectively to spaced points on one of said flexible strips, the different yoke members being connected to different strips, a bridge-piece having its ends hingedly connected to said yokes, and means for attaching the bridge-piece to a windscreen wiper arm.

2. A windscreen wiper blade comprising a squeegee element, a plurality of yoke members arranged end-to-end along the back of said squeegee element, a plurality of flexible strips respectively connected adjacent opposite ends thereof to opposite ends of the yokes each strip being connected to only one yoke, means connecting the flexible strips to the squeegee element at or adjacent the rear thereof, said strips having their plane surfaces extending substantially parallel to the surface of the windscreen so that the strips can flex in the plane of the squeegee element to allow the squeegee element to assume a concave form whilst they restrain transverse flexing of the squeegee element, and a bridge-piece having its opposite ends hingedly connected to spaced yokes.

3. A windscreen wiper blade as claimed in claim 2, wherein two flexible strips extend in spaced parallel relation between the two ends of a yoke and interfit respectively with grooves formed along opposite sides of the squeegee element.

4. A windscreen wiper blade as claimed in claim 2, wherein each said flexible strip is formed integrally with its associated yoke member.

5. A windscreen wiper blade as claimed in claim 3, wherein each yoke member is made of sheet metal and has at least one flexible metal strip formed integrally with the yoke member and extending inwardly from one end of the yoke member towards the opposite end thereof, said at least one flexible metal strip being connected to the squeegee element at or adjacent the rear thereof and being flexible in a plane normal to the windscreen and substantially rigid in a plane generally parallel to the windscreen.

6. A device as claimed in claim 5, wherein said at least one flexible strip extends completely from one end to the other of the yoke member, said strip being integral with the yoke at one end and being supported by the other end of the yoke in a manner permitting relative longitudinal movement between said at least one strip and said other end of the yoke.

7. A windscreen wiper blade comprising a squeegee element, at least two yokes arranged end-to-end along the rear of the squeegee element, a bridge-piece having its ends hingedly connected respectively to said two yokes, and at least two flexible strips each extending part-way along and at or adjacent the rear of the squeegee element, said at least two strips being formed integrally with said at least two yokes respectively and being assembled to the squeegee element so as to permit the latter to flex in a plane normal to the windscreen but to restrain transverse flexing thereof, each of said flexible strips extending respectively from end-to-end of the yoke with which it is integrally formed.

8. A windscreen wiper blade as claimed in claim 7, wherein the free ends of the strips are respectively supported at the said other ends of their associated yokes.

9. A windscreen wiper blade as claimed in claim 8 wherein said supporting means permit the free ends of the strips to move longitudinally relative to the supporting means to allow the strips to flex.

10. A windscreen wiper blade as claimed in claim 2, wherein each yoke is of arched form and is flexible in a plane normal to the windscreen, the ends of the yoke being connected to the associated flexible strip so that as the latter flexes to conform with a portion of a windscreen of increased curvature, the ends of the yoke will be moved closer together, the pressure exerted by the windscreen wiper arm on the yoke tending to force its ends apart and thus to urge the flexible strip and the squeegee element to a straight condition.

11. A windscreen wiper blade which is capable of wiping a curved windscreen comprising a plurality of flexible strips arranged along and assembled to the squeegee element so as to permit the latter to flex in a plane normal to the windscreen but to restrain transverse flexing thereof, a plurality of yokes one for each strip, disposed along the back of the squeegee element in positions corresponding to the disposition of the strips, said yokes having their opposite ends thereof connected to the corresponding flexible strip, and a bridge-piece hingedly interconnecting said yokes, wherein each yoke is of arched form and is flexible in the said plane normal to the windscreen, the ends of a yoke being connected to its corresponding flexible strip so that as the latter flexes to conform with a portion of a windscreen of increased curvature, the ends of the yoke will be moved closer together, the pressure exerted by the windscreen wiper arm on the yoke tending to force its ends apart and thus to urge the flexible strip and the squeegee element to a straight condition.

12. A windscreen wiper blade as claimed in claim 11, wherein a yoke is, at least part way along its length, made of flexible material.

13. A windscreen wiper blade as claimed in claim 11, wherein a yoke is made of two or more hingedly connected parts.

References Cited in the file of this patent
UNITED STATES PATENTS

| | | |
|---|---|---|
| 2,596,063 | Anderson | May 6, 1952 |
| 2,634,446 | Mackie et al. | Apr. 14, 1953 |
| 2,659,097 | Morton | Nov. 17, 1953 |
| 2,667,656 | Oishei | Feb. 2, 1954 |
| 2,672,641 | Scinta et al. | Mar. 23, 1954 |
| 2,859,468 | O'Shei | Nov. 11, 1958 |